United States Patent
Reichenbach

(10) Patent No.: US 7,849,995 B2
(45) Date of Patent: Dec. 14, 2010

(54) CONVEYING DEVICE

(75) Inventor: Rainer Reichenbach, Schlier (DE)

(73) Assignee: Mueller Weingarten AG, Weingarten (DE)

( * ) Notice: Subject to any disclaimer, the term of this patent is extended or adjusted under 35 U.S.C. 154(b) by 512 days.

(21) Appl. No.: 10/586,268

(22) PCT Filed: Jan. 5, 2005

(86) PCT No.: PCT/DE2005/000003

§ 371 (c)(1),
(2), (4) Date: Dec. 8, 2008

(87) PCT Pub. No.: WO2005/068103

PCT Pub. Date: Jul. 28, 2005

(65) Prior Publication Data

US 2009/0078532 A1    Mar. 26, 2009

(30) Foreign Application Priority Data

Jan. 15, 2004 (DE) .................. 10 2004 002 143

(51) Int. Cl.
*B65G 37/00* (2006.01)

(52) U.S. Cl. ............................ 198/346.2; 198/774.1

(58) Field of Classification Search .............. 198/346.2, 198/774.1
See application file for complete search history.

(56) References Cited

U.S. PATENT DOCUMENTS

| 4,924,997 | A * | 5/1990 | Wunsch ................. 198/345.1 |
| 6,247,226 | B1 * | 6/2001 | Lundberg et al. ............. 29/740 |
| 2003/0084701 | A1 | 5/2003 | Kawamoto |
| 2003/0084704 | A1 | 5/2003 | Kawamoto |

FOREIGN PATENT DOCUMENTS

| DE | 196 36 822 | 3/1998 |
| DE | 198 01 731 | 7/1999 |
| EP | 1 040 881 | 10/2000 |

* cited by examiner

*Primary Examiner*—Gene Crawford
*Assistant Examiner*—Kavel P Singh
(74) *Attorney, Agent, or Firm*—Jordan and Hamburg LLP

(57) ABSTRACT

Disclosed is a device for conveying workpieces through a press working line or a transfer molding press. The conveying device is embodied as a telescopic feeder and is designed such that a jib which can be displaced in a longitudinal direction is mounted or guided by means of guiding carriages that travel along. An adequate entraining mechanism is provided in order to ensure the traveling motion of the guiding carriages.

6 Claims, 3 Drawing Sheets

CONVEYING DEVICE

BACKGROUND OF THE INVENTION

The invention relates to a conveying device for conveying workpieces through a press line, transfer press, or the like.

Where the manufacture of a workpiece calls for a plurality of punch and shaping operations, then for economic production the necessary individual operations can be carried out in a press line, transfer press, or large component transfer press.

As a rule, such systems are provided with conveying device for automatically conveying workpieces. These conveying device either possess their own drives or are actuated by the press drive. DE 198 01 731 A1 discloses a conveying device with discrete drives. Two stationary drive motors drive a telescoping extension arm arrangement via a traction means arrangement. By controlling the speed of rotation and direction of rotation of the drive motors, the conveying device known as a telescoping feeder performs horizontal and vertical movements. The required conveying path generally comprises overlapping horizontal and vertical movements. Any movement profile can be traveled with this system.

A telescoping feeder has proved itself in practice. However, problems occur in particular during use on large conveying paths. For example, when producing for instance quarter panels for a motor vehicle body, the intervals for the shaping stages can be 6 meters and more.

In this case, a guide system with a broad base and great stiffness is needed for the telescoping feeder. However, since the length of the extension arm is supposed to be as short as possible for preventing edges during conveying and for preventing collisions during the shaping process, this also affects the quality of the guidance.

BRIEF SUMMARY OF THE INVENTION

The object underlying the invention is to further develop the prior art and suggest a guide for the extension arm(s) of a telescoping feeder, which guide assures good quality of guidance.

The idea underlying the invention is that a longitudinally displaceable extension arm is borne on a fixed traverse member such that during horizontal displacement of said extension arm the guide carriages travel half of the displacement path. Due to this movement there is thus a type of carrying support or guidance. In order to assure the travel movement of the guide carriage, a corresponding carrying apparatus is provided.

For instance, a rack can be provided on the fixed transverse member and a rack can be provided on the moveable extension arm, which racks are mechanically linked to a toothed wheel attached to the guide carriage. The guide carriage is then forcibly carried along during horizontal displacement.

The desired broad guide base for the telescoping feeder is attained using the horizontal position of each guide carriage.

Rapid accelerations and speeds are necessary for attaining lower conveying times. The dynamic movements are easy to control because the suggested guide system is characterized by great stiffness. Thus only minor vibrations occur when the workpiece is conveyed, which promotes defined placement onto the die, and also the holding forces during conveying are easy to control.

The telescoping feeders are arranged in pairs and in a mirror image of one another in the area of the press upright. Slides that can also travel and that are coupled to a transverse crossmember are located on the movable extension arm. The transverse crossmember is fitted with means conveying the workpiece. The horizontal movement of the extension arm and the slide is actuated by at least one controllable drive that is mechanically linked to two toothed belt drives.

It is also possible to use two drives in an advantageous manner, this enhancing the functional security of the conveying device, i.e. if one drive fails, the second drive would move the telescoping feeder out of a possible collision area.

A vertical movement is provided as an additional production axis. For this purpose, a drive system for the vertical lift is connected to the horizontally locationally fixed holding device.

Since it is possible to do without an intermediate positioning or orientation station in the suggested conveying direction, the design is structured modularly such that it is possible to integrate additional clearances needed for changing the position of the workpieces. For instance, the workpiece can be pivoted in the conveying direction and counter thereto. For this purpose, the transverse crossmember on the slide is borne rotatable and eccentric, which renders the workpiece pivotable at its center of mass.

It is also possible to have the transverse crossmember and thus the workpiece at an inclined position with no problem, since the vertical axes can be traveled independent of one another. Likewise, double parts can be conveyed with no limitation.

BRIEF DESCRIPTION OF THE DRAWINGS

Accompanying the specification are figures which assist in illustrating the embodiments of the invention, in which.

DETAILED DESCRIPTION OF THE INVENTION

Figure 1:
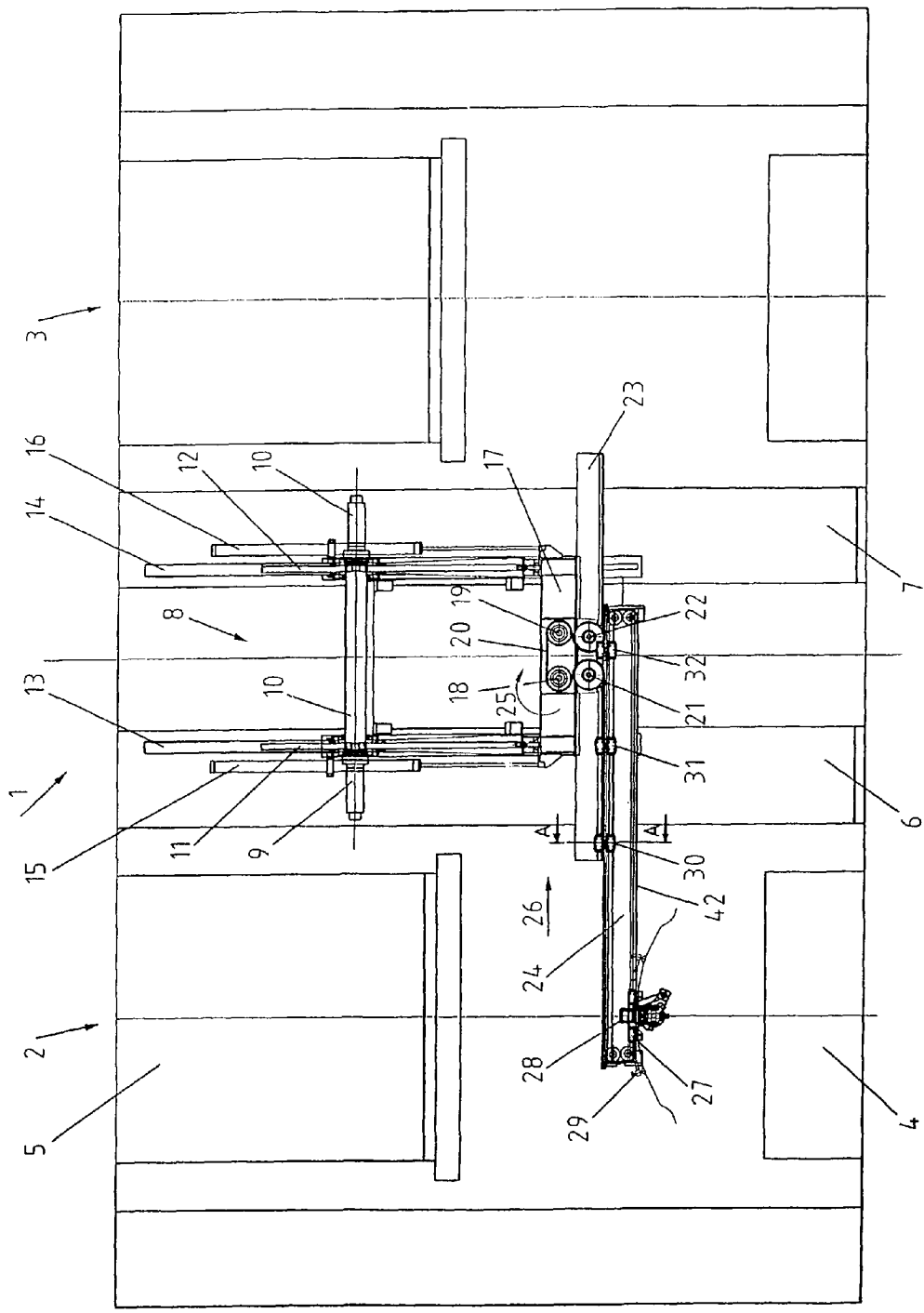
FIG. 1 illustrates a partial view of 2 presses with a telescoping feeder in the workpiece removal position.

FIG. 1 depicts partial views of the shaping areas of the presses 2 and 3 in a simplified depiction of a press line 1. The sliding table 4 and the ram 5 can be seen. The punch and die are not shown in greater detail. The telescoping feeder 8 is attached to the press uprights 6, 7. Fixed, controllable motors 9, 10 effect the drive for the vertical movement and act via pinion gears on racks 11, 12. Linear guides 13, 14 assure certain vertical guidance. Forced synchronization of the lift movement is attained using the connecting shaft 41. For unloading the drives 9, 10, the masses to be moved can be compensated by cylinders 15, 16.

The racks 11, 12 are joined to the transverse crossmember 17 on which are arranged the motors 18, 19 that drive a toothed belt 20. For reasons of functional security, two motors are suggested 18, 19 so that if one of the motors fails the telescoping feeder can be moved out of a potential collision area using the second motor.

The toothed belt 20 is reversed via two belt pulleys 21, 22 that are rotatably borne on the fixed transverse member 23 and is a attached to a movable extension arm 24. Thus, activating the drives 18, 19 in the rotational direction 25 moves the extension arm 24 horizontally in the direction of the arrow 26. Located on the extension arm 24 is a slide 27 that can likewise travel horizontally and having a transverse crossmember 28 coupled thereto. The transverse crossmember 28 is equipped with workpiece holding means 29. The slide 27 is moved in a known manner via a toothed belt 42 that is held on the fixed transverse member 23 using a clamping connection.

The moveable extension arm 24 is guided and supported on the transverse member 23 using guide carriages 30, 31, 32.

Figure 3:
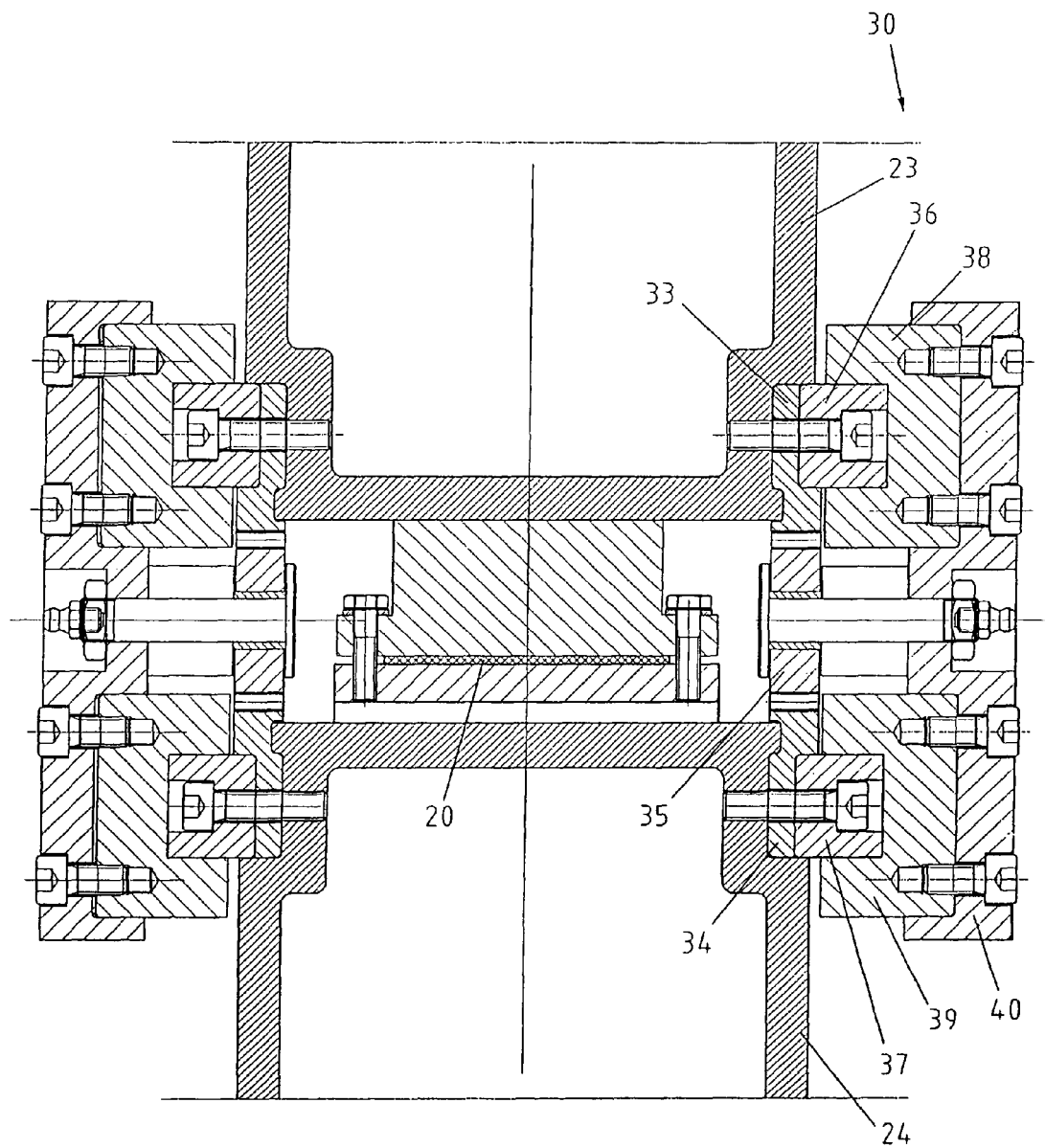
FIG. 3 is a section through a guide carriage in accordance with line A-A in FIG. 1.

FIG. 3 depicts the cross-section of the guide carriage 30. The rack 33 is securely joined to the transverse member 23 and the rack 34 is securely joined to the extension arm 24. A toothed wheel 35 is situated between the racks 33 and 34 and is in constant contact with both. Linear guides 36 and 37 are attached to the racks 33 and 34. The guide shoes 38 and 39 of the linear guide are joined to one another by a holding plate 40.

Figure 2:
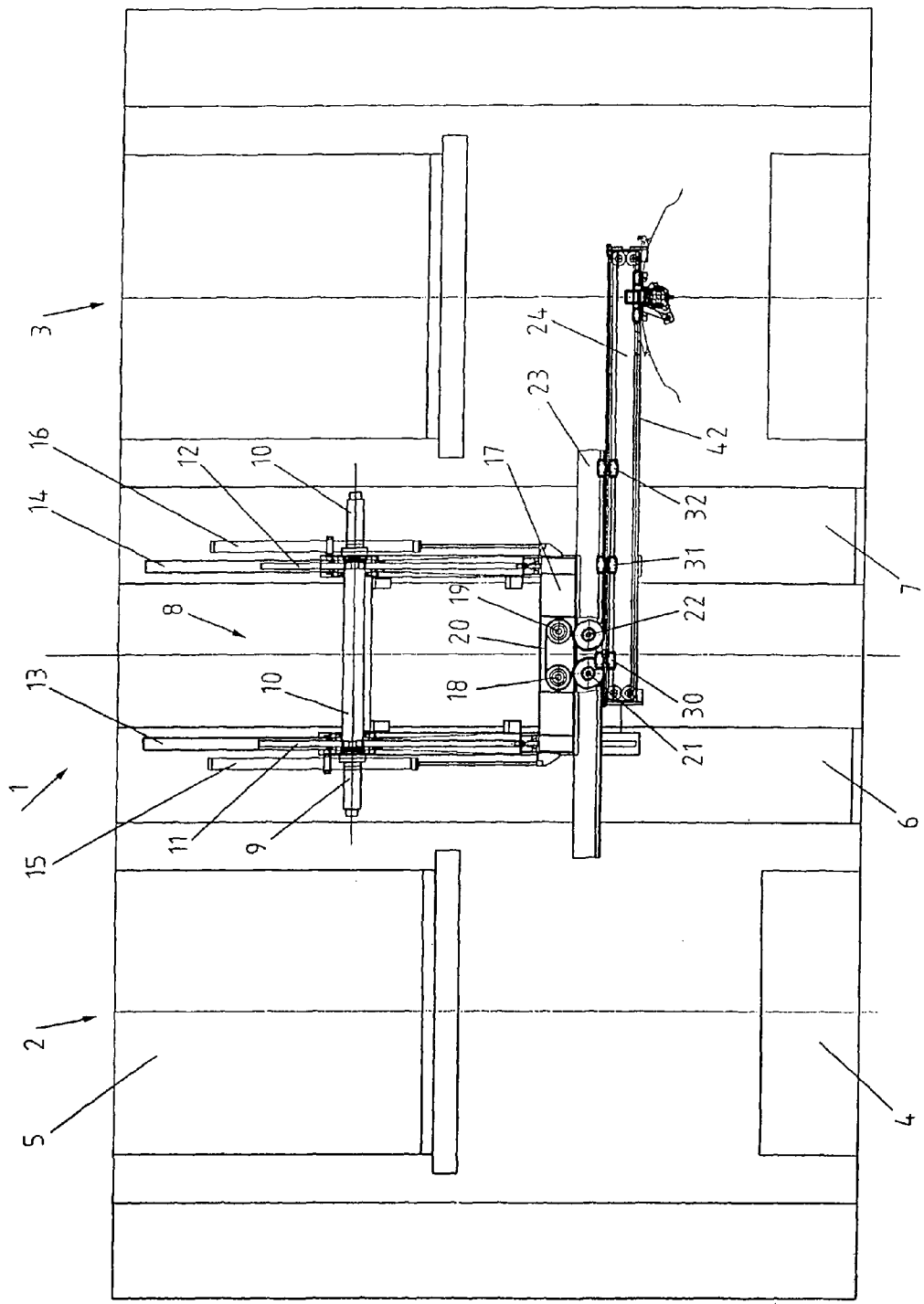
FIG. 2 is like FIG. 1, however the telescoping feeder is in the workpiece placement position.

The linear guides 36, 37 are configured such that the guide shoes 38, 39 are also held perpendicular to the direction of movement. If the toothed belt 20 is driven by the motors 18, 11, this also causes the extension arm 24 and the rack 34 to move. The carrying device for the guide carriage functions such that the toothed wheel 35 rolls on the racks 33 and 34, and the guide carriage 30 connected to the toothed wheel 35 moves in the direction of the extension arm 24. The same drive and movement sequence also apply for the guide carriages 31 and 32. As can be seen from FIGS. 1 and 2, the position of the guide carriage 30 changes with the movement of the extension arm 24 and is parallel thereto, so that support of the extension arm 24 is assured.

The invention is not limited to the described and depicted exemplary embodiment. For instance the carrying movement of the guide carriage can occur using linear gears such as chains or toothed belts. Likewise, linear guidance can be performed in different geometrical configurations such as for instance flat or circular guidance and as sliding or rolling guidance. The inventive step can also be applied for multiple telescoping units without limitation. In this case, guide carriages with carrying apparatus are arranged for each pair of telescoping units.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

The invention claimed is:

1. A conveying device for conveying workpieces comprising:
   a lifting apparatus connected to a first transverse crossmember;
   a transverse member supported by said transverse crossmember, said transverse member being horizontally fixed and comprising a longitudinal axis;
   at least one guide carriage mounted on said transverse member;
   an extension arm mounted with said at least one guide carriage so as to be mounted with said transverse member, said extension arm being horizontally movable parallel to said longitudinal axis of said transverse member and guided by said at least one guide carriage relative to said transverse member during said horizontal movement,
   a movable slide mounted with said extension arm and movable horizontally therealong, said movable slide being coupled to a second transverse crossmember, said second transverse crossmember comprising a workpiece holding means and being rotatably and eccentrically positioned relative to said movable slide and said extension arm so as to enable the workpiece holding means and the workpiece held thereby to be pivotable relative to said extension arm;
   a pair of linear guides for connecting said at least one guide carriage to said extension arm and to said transverse member, each of the pair of linear guides being respectively attached to said extension arm and to said transverse member; and
   a carrying device for horizontally driving said at least one guide carriage responsive to movement of said extension arm.

2. The conveying device of claim 1, wherein:
   said carrying device comprises first and second racks and a toothed wheel; and
   said second rack being securely joined to said extension arm and said first rack being securely joined to said transverse member.

3. The conveying device of claim 1, wherein:
   each said linear guide is a rolling or sliding guide comprises a flat or circular guide.

4. The conveying device of any one of claims 1 to 3, wherein:
   each said linear guide includes first and second guide shoes; and
   a holding plate connects said guide shoes.

5. The conveying device of any one of claims 1 to 3, wherein:
   said extension arm is a telescoping multiple extension arm; and
   each telescoping multiple extension arm guide includes a respective carriage with a respective carrying apparatus.

6. The conveying device of any one of claims 1 to 3, wherein:
   said carrying apparatus is a chain drive or toothed belt drive.

* * * * *